United States Patent
Shimakawa et al.

(10) Patent No.: US 12,481,106 B2
(45) Date of Patent: Nov. 25, 2025

(54) OPTICAL-FIBER BUNDLE STRUCTURE, OPTICAL CONNECTION STRUCTURE, AND METHOD OF MANUFACTURING OPTICAL-FIBER BUNDLE STRUCTURE

(71) Applicant: SUMITOMO ELECTRIC INDUSTRIES, LTD., Osaka (JP)

(72) Inventors: Osamu Shimakawa, Osaka (JP); Takahiro Kikuchi, Osaka (JP); Toshiki Taru, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 260 days.

(21) Appl. No.: 18/217,845

(22) Filed: Jul. 3, 2023

(65) Prior Publication Data

US 2024/0012209 A1    Jan. 11, 2024

(30) Foreign Application Priority Data

Jul. 11, 2022   (JP) ................. 2022-111358

(51) Int. Cl.
   *G02B 6/38*  (2006.01)
   *G02B 6/40*  (2006.01)

(52) U.S. Cl.
   CPC .......... *G02B 6/403* (2013.01); *G02B 6/3825* (2013.01)

(58) Field of Classification Search
   CPC .... G02B 6/403; G02B 6/3825; G02B 6/3806; G02B 6/3668; G02B 6/38
   See application file for complete search history.

(56) References Cited

U.S. PATENT DOCUMENTS

| | | | |
|---|---|---|---|
| 3,912,362 A | 10/1975 | Hudson | |
| 6,264,375 B1* | 7/2001 | Ohtsuka | G02B 6/3885 385/60 |
| 2008/0069502 A1 | 3/2008 | Ma | |
| 2014/0037259 A1* | 2/2014 | Bragg | H01R 13/743 361/627 |

FOREIGN PATENT DOCUMENTS

| | | |
|---|---|---|
| JP | 2013-68891 A | 4/2013 |
| JP | 2017-181791 A | 10/2017 |

* cited by examiner

*Primary Examiner* — Jennifer Doan
(74) *Attorney, Agent, or Firm* — Oliff PLC

(57) ABSTRACT

In each of the plurality of optical fibers, a second diameter portion has a diameter larger than that of a first diameter portion. A tapered portion connects the first diameter portion and the second diameter portion by a tapered surface. In a fiber accommodating, a second accommodating portion has an inner diameter larger than that of a first accommodating portion. Each first diameter portion is located in the first accommodating portion. Each second diameter portion is located in the second accommodating portion. The second accommodating portion includes a plurality of regions divided by imaginary planes perpendicular to the first direction. The tapered portions of the optical fibers adjacent to each other among the plurality of optical fibers are located in the different regions among the plurality of regions.

16 Claims, 12 Drawing Sheets

OPTICAL-FIBER BUNDLE STRUCTURE, OPTICAL CONNECTION STRUCTURE, AND METHOD OF MANUFACTURING OPTICAL-FIBER BUNDLE STRUCTURE

CROSS REFERENCE TO RELATED APPLICATIONS

This application claims priority based on Japanese Patent Application No. 2022-111358 filed on Jul. 11, 2022, and the entire contents of the Japanese patent application are incorporated herein by reference.

TECHNICAL FIELD

The present disclosure relates to an optical-fiber bundle structure, an optical connection structure, and a method of manufacturing an optical-fiber bundle structure.

BACKGROUND

PTL 1 discloses an optical-fiber bundle structure including a ferrule and a plurality of optical fibers accommodated in a fiber accommodating portion of the ferrule. Each of the plurality of optical fibers includes a first diameter portion and a second diameter portion having a diameter larger than that of the first diameter portion. The fiber accommodating portion includes a first accommodating portion and a second accommodating portion having an inner diameter larger than that of the first accommodating portion. The first diameter portion of each optical fiber is accommodated in the first accommodating portion.

PTL 1: U.S. Patent Application Publication No. 2008/0069502
PTL 2: U.S. Pat. No. 3,912,362
PTL 3: Japanese Unexamined Patent Application Publication No. 2013-68891
PTL 4: Japanese Unexamined Patent Application Publication No. 2017-181791

SUMMARY

An optical-fiber bundle structure according to the present disclosure includes, a ferrule and a plurality of optical fibers. The ferrule includes a fiber accommodating portion. The fiber accommodating portion is formed in a hollow shape having a circular cross section and extends in a first direction. The plurality of optical fibers are accommodated in the fiber accommodating portion. Each of the plurality of optical fibers includes a first diameter portion, a second diameter portion, and a tapered portion. The second diameter portion has a diameter larger than that of the first diameter portion. The tapered portion connects the first diameter portion and the second diameter portion to each other by a tapered surface. The tapered surface has a tapered shape. The fiber accommodating portion includes a first accommodating portion and a second accommodating portion. The second accommodating portion has an inner diameter larger than that of the first accommodating portion. The first diameter portion of each of the plurality of optical fibers is located in the first accommodating portion. The second diameter portion of each of the plurality of optical fibers is located in the second accommodating portion. The second accommodating portion includes a plurality of regions divided by a plurality of imaginary planes perpendicular to the first direction. The tapered portions of the optical fibers adjacent to each other among the plurality of optical fibers are located in the different regions among the plurality of regions.

An optical connection structure according to the present disclosure includes the optical-fiber bundle structure and a multi-core fiber. The multi-core fiber includes a plurality of cores extending in the first direction and a cladding covering the plurality of cores. At least one of the plurality of cores included in the multi-core fiber and at least one core of the plurality of optical fibers are optically coupled to each other.

A method of manufacturing an optical-fiber bundle structure according to the present disclosure includes preparing a ferrule and a plurality of optical fibers, pushing the plurality of optical fibers into the ferrule, and pulling the plurality of optical fibers back. The ferrule includes a fiber accommodating portion. The fiber accommodating portion is formed in a hollow shape having a circular cross section and extends in a first direction. The fiber accommodating portion includes a first accommodating portion and a second accommodating portion. The second accommodating portion has an inner diameter larger than that of the first accommodating portion. The plurality of optical fibers are accommodated in the fiber accommodating portion. Each of the plurality of optical fibers includes a first diameter portion, a second diameter portion, and a tapered portion. The second diameter portion has a diameter larger that of the first diameter portion. The tapered portion connects the first diameter portion and the second diameter portion to each other by a tapered surface. The tapered surface has a tapered shape. In the pushing the plurality of optical fibers, the plurality of optical fibers are pushed into the ferrule such that the first diameter portions of the plurality of optical fibers are inserted into the first accommodating portion. In the pulling the plurality of optical fibers back, the plurality of optical fibers are pulled back in a direction opposite to a direction in which the plurality of optical fibers are pushed. The second accommodating portion includes a plurality of regions divided by a plurality of imaginary planes perpendicular to the first direction. In the pulling the plurality of optical fibers back, the plurality of optical fibers are pulled back in the direction opposite to the direction in which the plurality of optical fibers are pushed such that the second diameter portion of each of the plurality of optical fibers is located in the second accommodating portion and such that the tapered portions of the optical fibers adjacent to each other among the plurality of optical fibers are located in the different regions among the plurality of regions while a state in which the first diameter portion of each of the plurality of optical fibers is located in the first accommodating portion is maintained.

DETAILED DESCRIPTION

Figure 1:
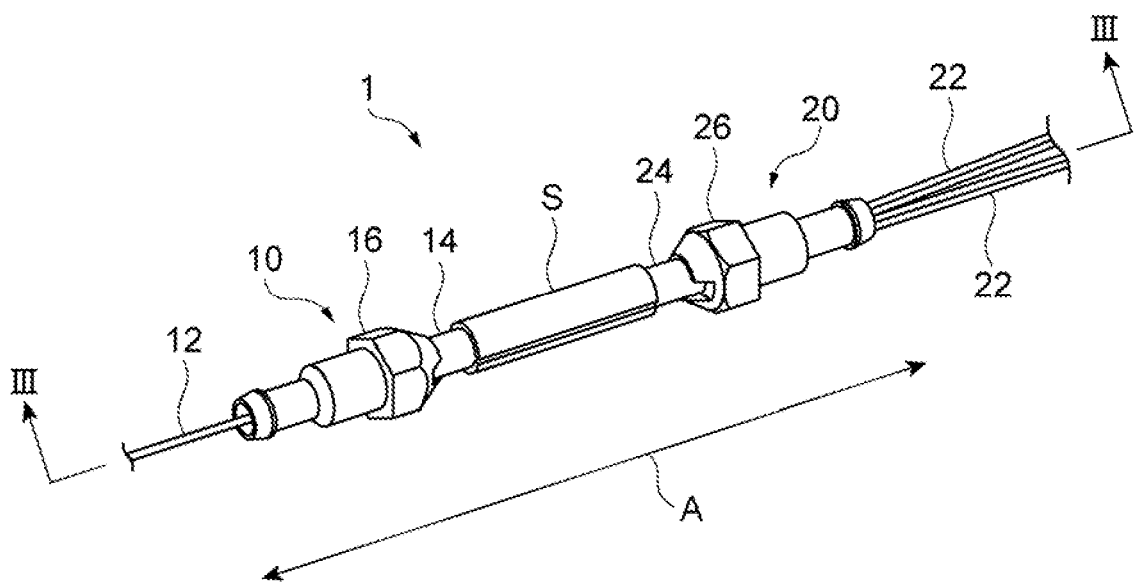
FIG. 1 is a perspective view showing an optical connection structure in an embodiment.

In the optical-fiber bundle structure disclosed in PTL 1, the plurality of optical fibers are accommodated in the first accommodating portion having the inner diameter smaller than that of the second accommodating portion. In such a configuration, the optical fiber may be bent at a connecting portion between the first accommodating portion and the second accommodating portion. When the optical fiber is bent, a so-called bending loss may occur. In particular, in the first diameter portion in which the diameter of the optical fiber is smaller than that of the second diameter portion, the diameter of the cladding is also smaller than that of the second diameter portion, and light is more likely to leak when the core is bent. Furthermore, in the above-described structure, the optical fiber may break due to stress caused by bending of the optical fiber in the fiber accommodating portion during the manufacturing process. When a structure in which the bending loss and the break in an optical fiber are reduced is adopted, the yield and production throughput of products having desired performance can be improved.

An object of the present disclosure is to provide an optical-fiber bundle structure and an optical connection structure having a structure capable of improving yield and production throughput while having desired performance, and a method of manufacturing an optical-fiber bundle structure capable of reducing optical loss and break of an optical fiber.

DESCRIPTION OF EMBODIMENTS OF PRESENT DISCLOSURE

First, embodiments of the present disclosure will be listed and explained.

(1) An optical-fiber bundle structure according to an embodiment of the present disclosure includes, a ferrule and a plurality of optical fibers. The ferrule includes a fiber accommodating portion. The fiber accommodating portion is formed in a hollow shape having a circular cross section and extends in a first direction. The plurality of optical fibers are accommodated in the fiber accommodating portion. Each of the plurality of optical fibers includes a first diameter portion, a second diameter portion, and a tapered portion. The second diameter portion has a diameter larger than that of the first diameter portion. The tapered portion connects the first diameter portion and the second diameter portion to each other by a tapered surface. The tapered surface has a tapered shape. The fiber accommodating portion includes a first accommodating portion and a second accommodating portion. The second accommodating portion has an inner diameter larger than that of the first accommodating portion. The first diameter portion of each of the plurality of optical fibers is located in the first accommodating portion. The second diameter portion of each of the plurality of optical fibers is located in the second accommodating portion. The second accommodating portion includes a plurality of regions divided by a plurality of imaginary planes perpendicular to the first direction. The tapered portions of the optical fibers adjacent to each other among the plurality of optical fibers are located in the different regions among the plurality of regions.

In the configuration of the optical-fiber bundle structure, the tapered portions of adjacent optical fibers among the plurality of optical fibers are respectively located in different regions among the plurality of regions. According to such a structure, the bending of the optical fiber is reduced and the bending loss and the break of the optical fiber are reduced. Therefore, bending loss in the optical-fiber bundle structure can be reduced, and yield and production throughput may be improved while having desired performance.

(2) The optical-fiber bundle structure according to (1), the plurality of first diameter portions included in the plurality of optical fibers may be arranged at a first pitch in the first accommodating portion. The plurality of second diameter portions included in the plurality of optical fibers may be arranged at a second pitch in the second accommodating portion. The second pitch may be equal to or more than the first pitch. In this case, the bending of the plurality of optical fibers can be further reduced, and the bending loss and the break of the plurality of optical fibers can be further reduced.

(3) The optical-fiber bundle structure according to (1) or (2), the tapered portions of the optical fibers that are not adjacent to each other among the plurality of optical fibers may overlap each other when viewed in a direction perpendicular to the first direction. In this case, the size of the optical-fiber bundle structure in the first direction may be reduced.

(4) The optical-fiber bundle structure according to (1) or (2), the plurality of optical fibers may be four optical fibers. The tapered portions of the four optical fibers may be located in the different regions among the plurality of regions. In this case, the bending of the optical fiber may be further reduced. The bending loss and the break of the optical fiber may be further reduced.

(5) The optical-fiber bundle structure according to any one of (1) to (4), a length of the first accommodating portion in the first direction may be 2 mm or more. In this case, since the gap between the first accommodating portion and the optical fiber is relatively small, the influence of expansion and contraction of the adhesive portion is reduced. Therefore, according to this configuration, the first diameter portion of each optical fiber is easily held by the first accommodating portion of the ferrule, and each optical fiber is not easily displaced with respect to the ferrule.

(6) The optical-fiber bundle structure according to any one of (1) to (5), a distance in the first direction between the tapered portions of the optical fibers adjacent to each other may be 0.2 mm or more. In this case, the bending of the optical fiber is further reduced, and the bending loss and the break of the optical fiber are further reduced.

(7) In the optical-fiber bundle structure according to any one of (1) to (6), a plurality of the tapered portions included in the plurality of optical fibers may be located in the second accommodating portion. In this case, the tapered portions of the plurality of optical fibers can be protected by the ferrule. Therefore, the robustness of the optical-fiber bundle structure can be improved.

(8) In the optical-fiber bundle structure according to any one of (1) to (7), a distance in the first direction between the tapered portions of the optical fibers adjacent to each other may be 0.7 mm or less. In this case, the size of the optical-fiber bundle structure in the first direction can be reduced.

(9) The optical-fiber bundle structure according to (1) to (8), the optical fibers adjacent to each other may be configured such that an optical loss when light passes through the optical fibers is 0.15 dB or less at the wavelength of 1.55 μm in a state in which the optical fibers are wound in a single turn in an annular shape having a radius of curvature of 5 mm. In this case, the bending loss in the plurality of optical fibers can be further reduced.

(10) The optical-fiber bundle structure according to (1) to (9), the optical fibers adjacent to each other may be configured such that an optical loss when light passes through the optical fibers is 0.45 dB or less at the wavelength of 1.625 μm in a state in which the optical fibers are wound in a single turn in an annular shape having a radius of curvature of 5 mm. In this case, the bending loss in the plurality of optical fibers can be further reduced.

(11) An optical connection structure according to another embodiment of the present disclosure includes the optical-fiber bundle structure according to any one of (1) to (10) and a multi-core fiber. The multi-core fiber includes a plurality of cores extending in the first direction and a cladding covering the plurality of cores. At least one of the plurality of cores are included in the multi-core fiber and at least one core of the plurality of optical fibers are optically coupled to each other. According to such a structure, the bending of the core of the optical fiber may be reduced. The bending loss and the break of the optical fiber can be reduced. Therefore, the bending loss of the optical connection structure may be reduced, and the yield and production throughput can be improved while maintaining desired performance.

(12) A method of manufacturing an optical-fiber bundle structure according to another embodiment of the present disclosure includes preparing a ferrule and a plurality of optical fibers, pushing the plurality of optical fibers into the ferrule, and pulling the plurality of optical fibers back. The ferrule includes a fiber accommodating portion. The fiber accommodating portion is formed in a hollow shape having a circular cross section and extends in a first direction. The fiber accommodating portion includes a first accommodating portion and a second accommodating portion. The second accommodating portion has an inner diameter larger that of the first accommodating portion. The plurality of optical fibers are accommodated in the fiber accommodating portion. Each of the plurality of optical fibers includes a first diameter portion, a second diameter portion, and a tapered portion. The second diameter portion has a diameter larger than that of the first diameter portion. The tapered portion connects the first diameter portion and the second diameter portion to each other by a tapered surface. The tapered surface has a tapered shape. In the pushing the plurality of optical fibers, the plurality of optical fibers are pushed into the ferrule such that the first diameter portions of the plurality of optical fibers are inserted into the first accommodating portion. In the pulling the plurality of optical fibers back, the plurality of optical fibers are pulled back in a direction opposite to a direction in which the plurality of optical fibers are pushed. The second accommodating portion includes a plurality of regions divided by a plurality of imaginary planes perpendicular to the first direction. In the pulling the plurality of optical fibers back, the plurality of optical fibers are pulled back in the direction opposite to the direction in which the plurality of optical fibers are pushed such that the second diameter portion of each of the plurality of optical fibers is located in the second accommodating portion and such that the tapered portions of the optical fibers adjacent to each other among the plurality of optical fibers are located in the different regions among the plurality of regions while a state in which the first diameter portion of each of the plurality of optical fibers is located in the first accommodating portion is maintained. In this case, an optical-fiber bundle structure in which bending of the optical fiber is reduced can be manufactured. Therefore, the bending loss and the break of the optical fiber can be reduced.

Details of Embodiments of Present Disclosure

Specific examples of embodiments of the present disclosure are described below with reference to the drawings. The present invention is not limited to these examples, but is defined by the scope of the claims, and is intended to include all modifications within the meaning and scope equivalent to the scope of the claims. In the description of the drawings, the same elements are denoted by the same reference numerals, and redundant description is omitted.

Figure 2:
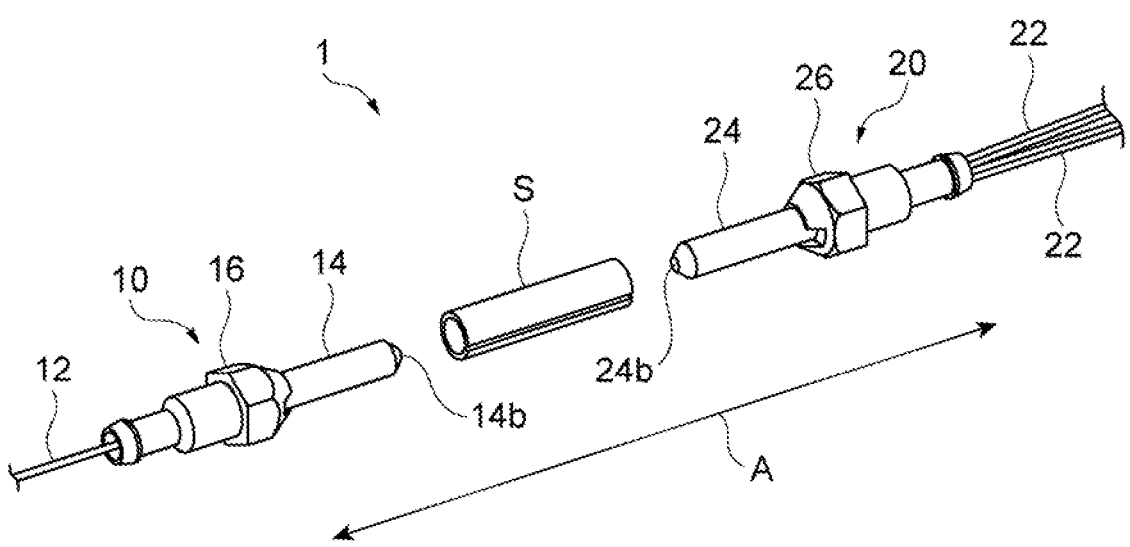
FIG. 2 is an exploded perspective view of the optical connection structure shown in FIG. 1.
Figure 3:
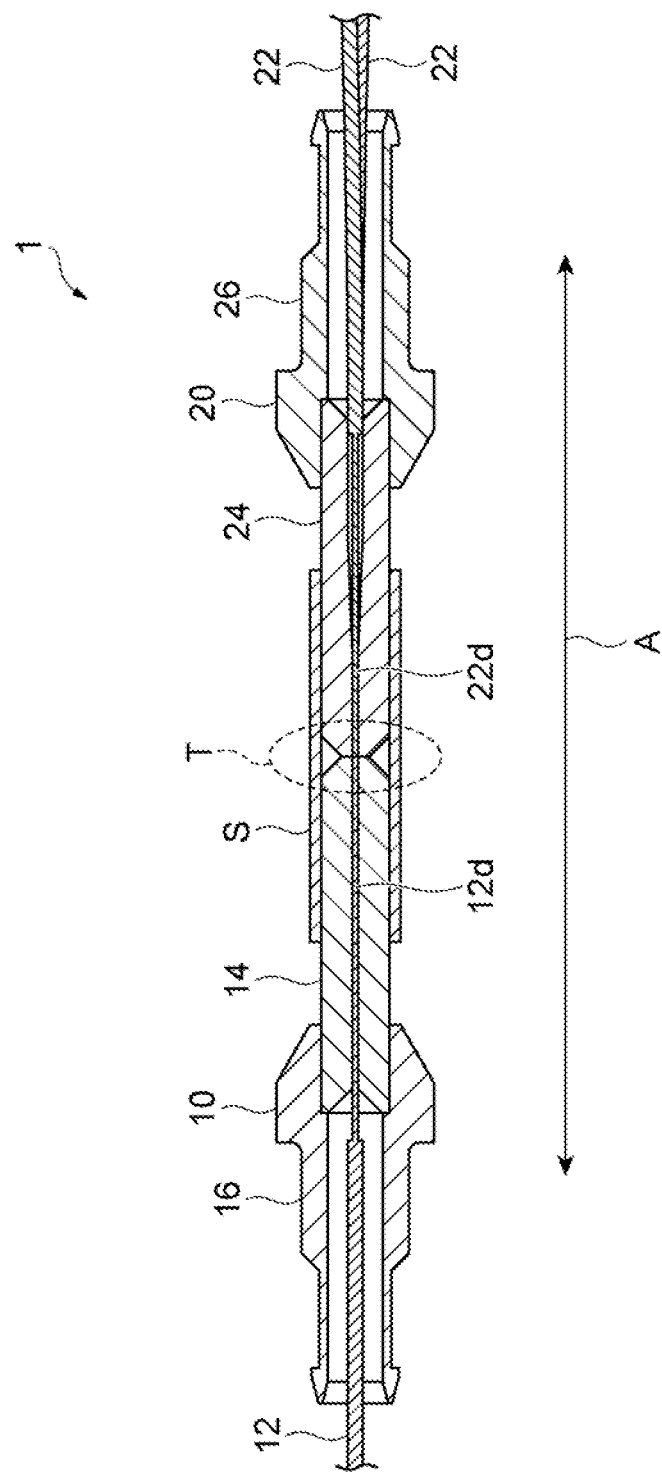
FIG. 3 is a cross-sectional view of the optical connection structure shown in FIG. 1 taken along line III-III.

FIG. 1 is a perspective view showing an optical connection structure in an embodiment. FIG. 2 is an exploded perspective view of the optical connection structure shown in FIG. 1. FIG. 3 is a cross-sectional view of the optical connection structure shown in FIG. 1 taken along line III-III. As shown in FIGS. 1 to 3, an optical connection structure 1 includes a first optical fiber holder 10, a second optical fiber holder 20, and a split sleeve S. First optical fiber holder 10 includes a multi-core fiber 12 (hereinafter also referred to as an "MCF 12"), a ferrule 14, and a flange 16. Second optical fiber holder 20 includes a plurality of optical fibers 22, a ferrule 24, an adhesive portion 25, and a flange 26. Second optical fiber holder 20 includes an optical-fiber bundle structure. Split sleeve S is a member that holds and aligns ferrules 14 and 24 from the outside so that the optical axis of each core of MCF 12 of first optical fiber holder 10 is aligned with the optical axis of each core of the plurality of optical fibers 22.

Figure 4:
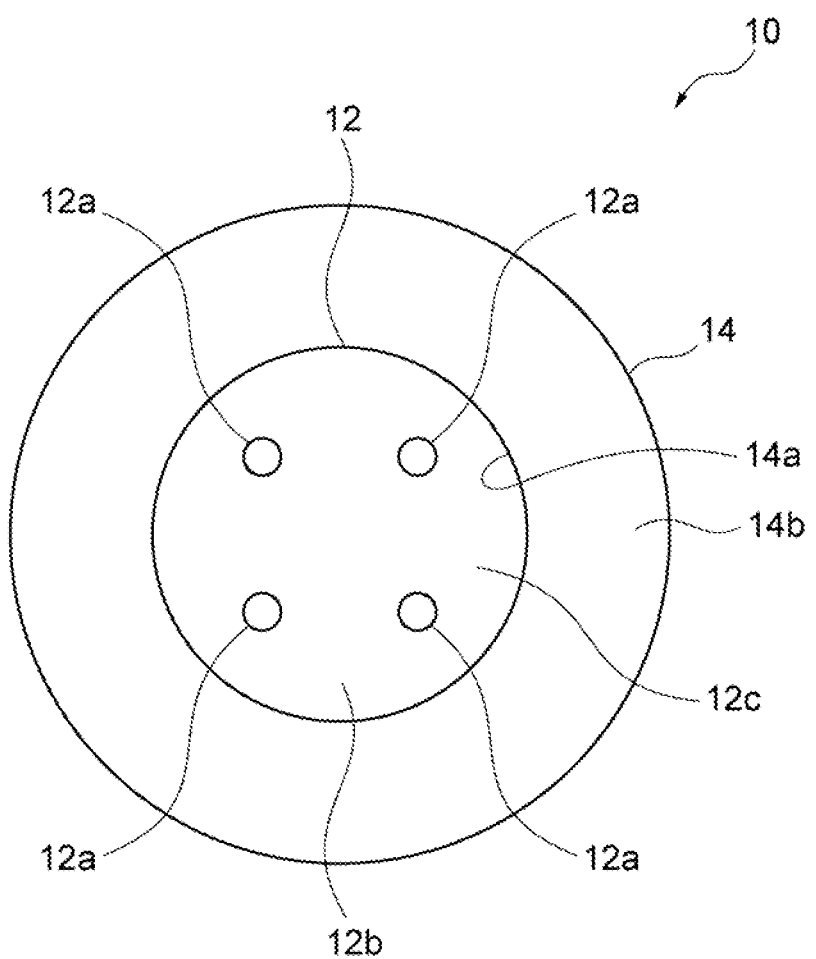
FIG. 4 shows an end surface of a first optical fiber holder.

MCF 12 extends in a direction A (first direction). That is, direction A corresponds to the longitudinal direction of MCF 12. As shown in FIGS. 3 and 4, MCF 12 includes a plurality of cores 12a extending in direction A, a cladding 12b extending in direction A and collectively covering the plurality of cores 12a, and a tip surface 12c. FIG. 4 shows an end surface of first optical fiber holder 10. FIG. 4 shows the tip of MCF 12 and the end surface of ferrule 14. Tip surface 12c includes a plurality of tips of core 12a and a tip of cladding 12b. Core 12a may be made of silica glass to which a dopant such as germanium dioxide is added to increase the refractive index, and cladding 12b may be made of silica glass to which a dopant such as fluoride is added to decrease the refractive index, and the combination of the material and the dopant can be appropriately selected. In MCF 12, an optical signal having a predetermined wavelength can be propagated through each core 12a.

In MCF 12, for example, cores 12a are two dimensionally arranged. As shown in FIG. 4, MCF 12 has, for example, four cores 12a in one fiber. The number of cores 12a in MCF 12 is not limited to this. In the example shown in FIG. 4, four cores 12a are arranged in a square. The mode field diameter of each core 12a may be, for example, 15 µm or less or may be 5 µm or more. The core pitch of cores 12a may be 20 µm to 80 µm, for example. The "core pitch" corresponds to the distance between the centers of the cores in a cross section orthogonal to direction A. The diameter of cladding 12b may be, for example, 200 µm or less, 125 µm or less, 100 µm or less, 80 µm or less, or 50 µm or more.

Ferrule 14 is a cylindrical member that holds a tip portion 12d of MCF 12, and includes an inner hole 14a, which is a through hole that accommodates tip portion 12d of MCF 12, and an end surface 14b of ferrule 14. Ferrule 14 fixes tip portion 12d of MCF 12 to inner hole 14a so that tip surface 12c of MCF 12 is exposed inside end surface 14b. The inner diameter of inner hole 14a is the same as or slightly larger than that of MCF 12, and tip portion 12d of MCF 12 is fitted by being inserted into inner hole 14a. The length of ferrule 14 in direction A is, for example, 6 mm to 11 mm. Ferrule 14 is composed of a ceramic material such as zirconia or a glass material.

As shown in FIG. 3, flange 16 is a cylindrical member that holds the rear end portion of ferrule 14 and accommodates MCF 12 therein. The portion of MCF 12 accommodated in flange 16 may be fixed in flange 16 by an adhesive or the like. Flange 16 is made of, for example, metal or plastic.

Figure 5:
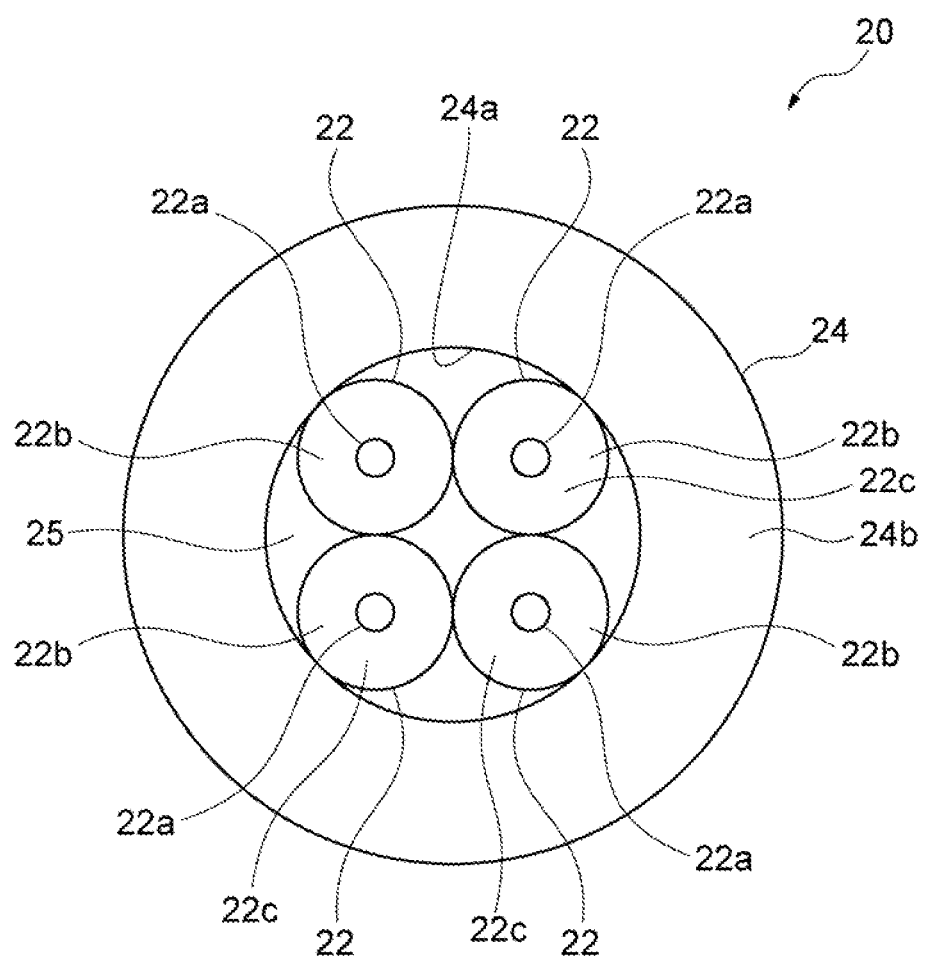
FIG. 5 shows an end surface of a second optical fiber holder.

The plurality of optical fibers 22 are optical fibers optically connected to MCF 12. As shown in FIGS. 3 and 5, each optical fiber 22 has a core 22a extending in direction A, a cladding 22b extending in direction A and covering core 22a, and a tip surface 22c. FIG. 5 shows an end surface of second optical fiber holder 20. FIG. 5 shows the tips of the plurality of optical fibers 22 and the end surface of ferrule 24. Tip surface 22c is composed of the tip of core 22a and the tip of cladding 22b. Core 22a may be made of silica glass to which a dopant such as germanium dioxide is added to increase the refractive index, and cladding 22b may be made of silica glass to which a dopant such as fluoride is added to decrease the refractive index, and the combination of materials and dopants can be appropriately selected. In optical fiber 22, an optical signal having a predetermined wavelength is propagated through each core 22a. Each of the plurality of optical fibers 22 is a single-core optical fiber having one core. As a modification of the embodiment of the present disclosure, each of the plurality of optical fibers 22 may be, for example, an optical-fiber bundle structure including a multi-core optical fiber, or a structure in which a single-core optical fiber and a multi-core optical fiber are mixed.

In second optical fiber holder 20, optical fibers 22 are arranged two dimensionally when viewed from direction A. As shown in FIG. 5, second optical fiber holder 20 has, for example, four optical fibers 22. Each optical fiber 22 is, for example, a single-mode optical fiber. Each optical fiber 22 has a single-peaked refractive index distribution profile. As a modification of the embodiment of the present disclosure, each optical fiber 22 may have a layer having a refractive index lower than that of cladding 22b between core 22a and cladding 22b, and may have a trench assisted type refractive index distribution profile. As a modification of the embodiment of the present disclosure, each optical fiber 22 may be a multi-mode optical fiber.

The number and arrangement of cores 22a of optical fiber 22 of second optical fiber holder 20 correspond to the number and arrangement of the plurality of cores 12a of MCF 12 of first optical fiber holder 10. Specifically, the arrangement of cores 22a of the plurality of optical fibers 22 coincides with the arrangement of the plurality of cores 12a of MCF 12. However, it is not necessary that the total number and arrangement of cores 22a of the plurality of optical fibers 22 completely coincide with the number and arrangement of cores 12a of MCF 12, and a configuration may be adopted in which some of cores 22a are not optically connected. Cores 22a of the plurality of optical fibers 22 of second optical fiber holder 20 are configured to be optically coupled to respective cores 12a of MCF 12 of first optical fiber holder 10 by rotational adjustment about the central axis of ferrule 24.

In optical connection structure 1, at least one of the plurality of cores 12a included in MCF 12 is optically coupled to at least one core 22a of the plurality of optical fibers 22. For example, when optical fiber 22 is a single-mode single-core optical fiber, each core 22a of optical fibers 22 corresponds to core 12a of MCF 12 of first optical fiber holder 10 on a one-on-one basis. For example, when optical fiber 22 is a multi-core optical fiber, a plurality of cores 22a in one optical fiber 22 correspond to a plurality of cores 12a of MCF 12 of first optical fiber holder 10.

Each optical fiber 22 is configured such that the optical loss at the wavelength of 1.550 µm when light passes through is 0.15 dB or less in a state where optical fiber 22 is wound in a single turn in an annular shape having a radius of curvature 5 mm, for example. Each optical fiber 22 is configured such that the optical loss when light is 0.45 dB or less at the wavelength of 1.625 µm in a state where optical fiber 22 is wound in a single turn in an annular shape having a radius of curvature 5 mm. Each of optical fibers 22 may have both of the above-described characteristics for light having a wavelength of 1.550 µm and the above-described characteristics for light having a wavelength of 1.625 µm, or may have one of the characteristics.

Ferrule 24 is a cylindrical member that collectively holds tip portions 22d of the plurality of optical fibers 22, and includes an inner hole 24a, which is a through hole that accommodates each tip portion 22d of the plurality of optical fibers 22, and an end surface 24b. Ferrule 24 is made of, for example, a ceramic material such as zirconia or a glass material.

Ferrule 24 fixes each tip portion 22d of the plurality of optical fibers 22 in inner hole 24a by adhesive portion 25 so that each tip surface 22c of the plurality of optical fibers 22 is exposed inside end surface 24b of ferrule 24. The inner diameter of inner hole 24a is equal to or slightly larger than that of the bundle of the plurality of optical fibers 22, and tip portions 22d of the plurality of optical fibers 22 are inserted into inner hole 24a and bonded and fixed by adhesive portion 25 filled in the gap between them.

Adhesive portion 25 is, for example, a thermosetting adhesive, and can be cured by heating. When ferrule 24 is mainly made of a ceramic material, adhesive portion 25 is, for example, a thermosetting epoxy-based adhesive or a thermosetting acrylic adhesive. When ferrule 24 is mainly made of a glass material, adhesive portion 25 is, for example, a thermosetting epoxy adhesive, a thermosetting acrylic adhesive, an ultraviolet-curable epoxy adhesive, or an ultraviolet-curable acrylic adhesive. Adhesive portion 25 does not depend on the material of ferrule 24 and is not limited thereto.

As shown in FIG. 3, flange 26 is a cylindrical member that holds the rear end portion of ferrule 24 and accommodates the plurality of optical fibers 22 therein. In other words, flange 26 corresponds to a holding portion that holds ferrule 24. The portion of the plurality of optical fibers 22 may be fixed in flange 26 by an adhesive or the like. Flange 26 is made of, for example, metal or plastic.

Figure 6:
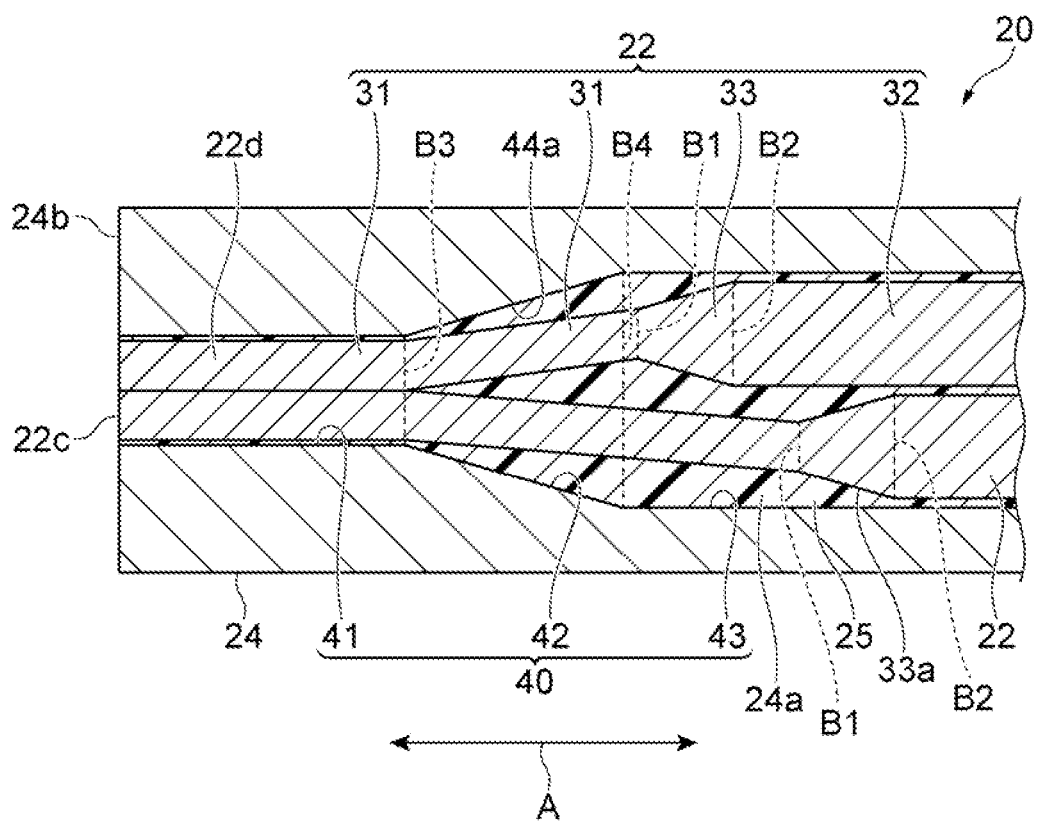
FIG. 6 is an enlarged partial cross-sectional view of a tip portion of a second optical fiber holder.
Figure 7:
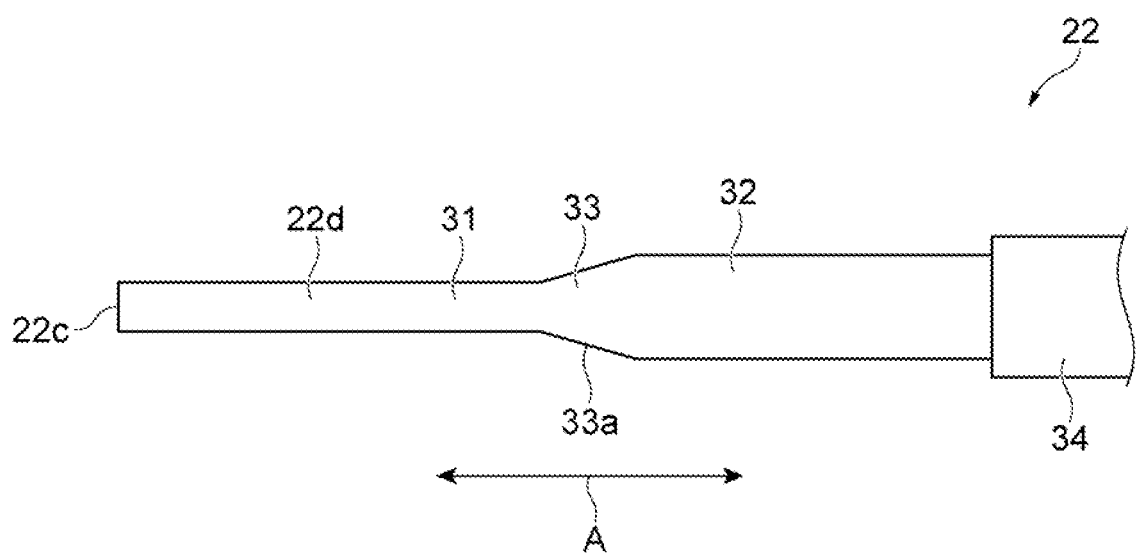
FIG. 7 is a partially enlarged view showing a tip portion of an optical fiber.
Figure 8:
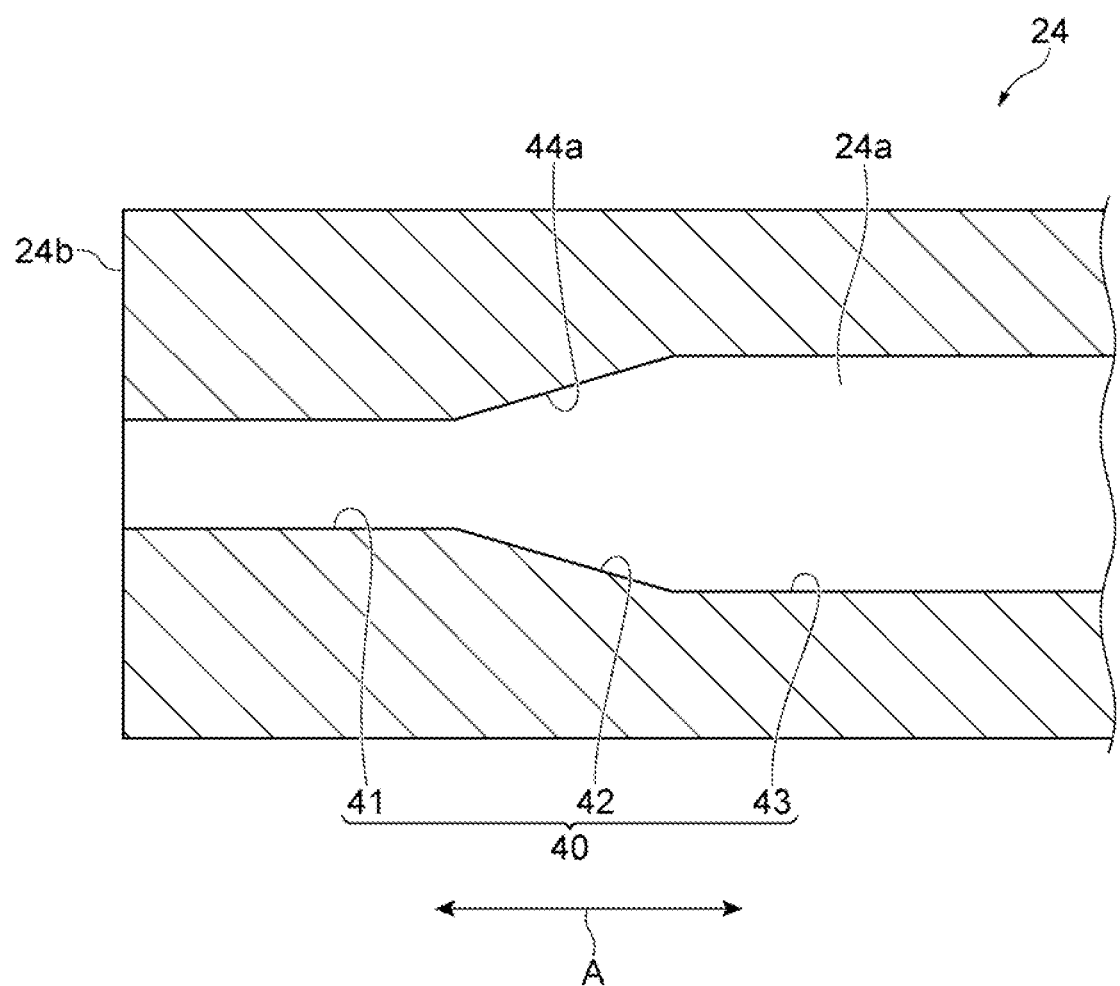
FIG. 8 is a partially enlarged view showing a cross-section of a tip portion of a ferrule in a first direction.
Figure 9:
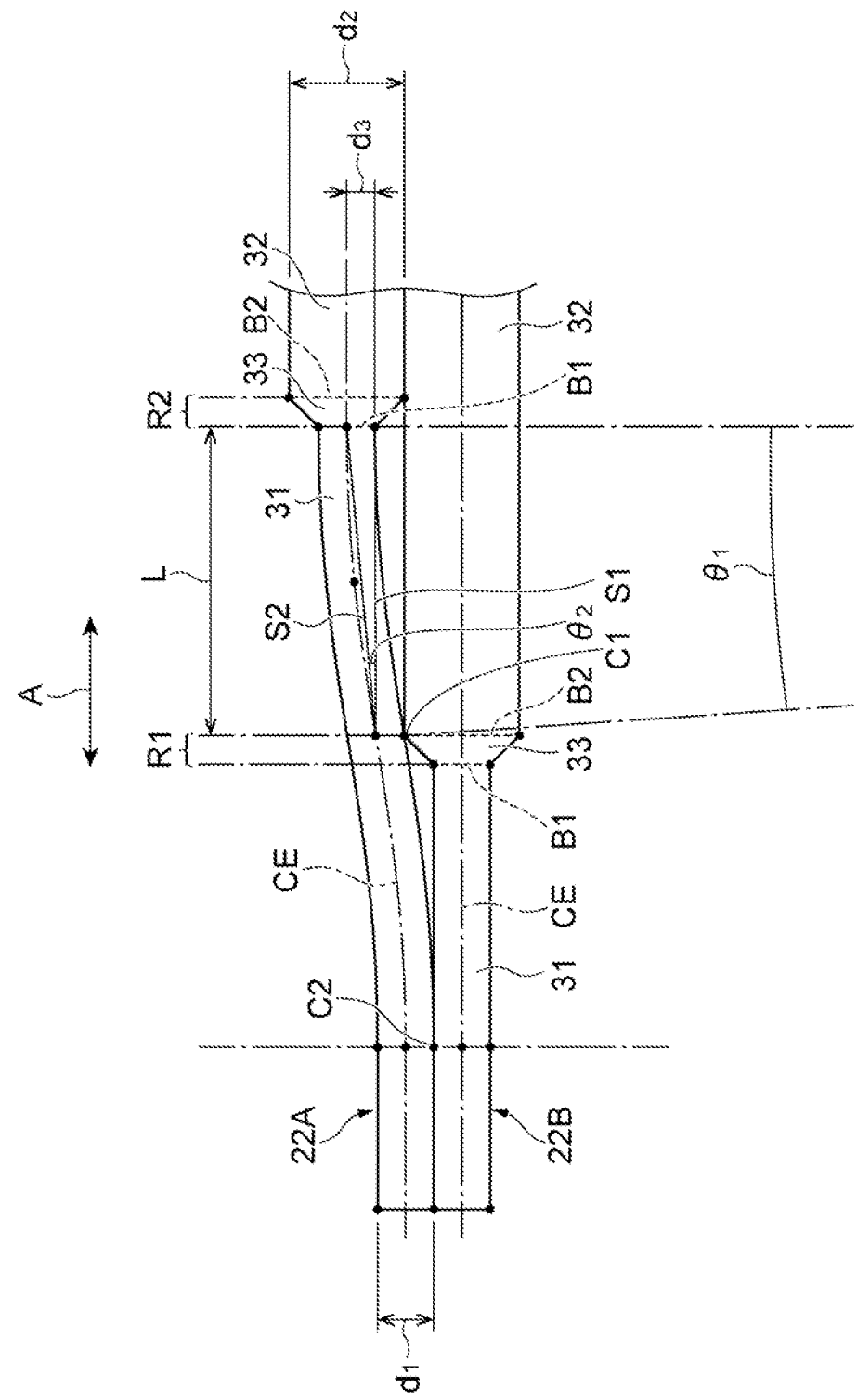
FIG. 9 is a partially enlarged view showing tip portions of a plurality of optical fibers accommodated in a fiber accommodating portion.

Referring now to FIGS. 6 to 9, one example of second optical fiber holder 20 in an embodiment of the present disclosure will be described in further detail. FIG. 6 is an enlarged partial cross-sectional view of a tip portion of second optical fiber holder 20 in direction A. FIG. 7 is a partially enlarged view showing a tip portion of optical fiber 22. FIG. 8 is a partially enlarged view showing a cross-section of the tip portion of ferrule 24 in direction A. FIG. 9 is a partially enlarged view showing tip portions of a plurality of optical fibers accommodated in a fiber accommodating portion.

Ferrule 24 includes a fiber accommodating portion 40. Fiber accommodating portion 40 is filled with adhesive portion 25. Fiber accommodating portion 40 is formed in a hollow shape having a circular cross section and extending in direction A. Fiber accommodating portion 40 corresponds to inner hole 24a described above. The plurality of optical fibers 22 are accommodated in fiber accommodating portion 40.

As shown in FIGS. 6 and 7, each of the plurality of optical fibers 22 includes a first diameter portion 31, a second diameter portion 32, and a tapered portion 33. First diameter portion 31 corresponds to a small-diameter optical fiber portion and has a diameter smaller than that of a general outer diameter. First diameter portion 31 is formed by an glass etching process using, for example, hydrofluoric acid water. Second diameter portion 32 corresponds to a portion having a general outer diameter. In other words, second diameter portion 32 has a diameter larger than that of first diameter portion 31. Tapered portion 33 includes a tapered surface 33a. Tapered surface 33a has a tapered shape. Tapered portion 33 connects first diameter portion 31 and second diameter portion 32 by tapered surface 33a. The outer diameter of optical fiber 22 gradually decreases from second diameter portion 32 toward first diameter portion 31.

The diameter of first diameter portion 31 is, for example, 20 µm to 80 µm. In the configuration shown in FIG. 7, the diameter of first diameter portion 31 is 40 µm. The diameter of second diameter portion 32 is, for example, 50 µm to 200 µm. In the configuration shown in FIG. 7, the diameter of second diameter portion 32 is 125 µm.

Each optical fiber 22 further includes a coating portion 34. Coating portion 34 covers a portion having the same diameter as second diameter portion 32 along the outer shape of optical fiber 22. Coating portion 34 has a diameter larger than that of second diameter portion 32. The diameter of coating portion 34 is, for example, 170 µm to 260 µm. In the arrangement shown in FIG. 7, the diameter of coating portion 34 is 250 µm.

As shown in FIG. 5, at tip surface 22c, the diameter of the circumscribed circle of first diameter portions 31 corresponds to the cladding diameter of MCF 12. The diameter of the circumscribed circle of first diameter portions 31 corresponds to the inner diameter of inner hole 24a of ferrule 24. On tip surface 22c, the plurality of optical fibers 22 are two dimensionally closely-packed in inner hole 24a. The term "two dimensionally close-packed" means that the maximum number of optical fibers 22 that can be arranged in inner hole 24a are arranged so that each optical fiber 22 does not move in inner hole 24a. For example, in inner hole 24a at tip surface 22c, the plurality of optical fibers 22 are arranged so as to be in contact with each other. Clearances (gaps) may be provided between the plurality of optical fibers 22 and inner hole 24a. At tip surface 22c, when the diameter of each of four first diameter portions 31 is 40 µm and the inner diameter of inner hole 24a is 96.6 µm, the clearances between the plurality of optical fibers 22 and inner hole 24a is zero.

The mode field diameter of each core 22a is, for example, 15 µm or less. The mode field diameter of each core 22a may be, for example, 5 µm or more. At tip surface 22c, the core pitch of cores 22a is, for example, 20 µm to 80 µm. At tip surface 22c, the diameter of cladding 22b is, for example, 20 µm to 125 µm. The inner diameter of inner hole 24a of ferrule 24 is, for example, 200 µm or less. The diameter of the circumscribed circle may be, for example, 125 µm or less, 100 µm or less, 80 µm or less, or 50 µm or more.

As shown in FIGS. 6 and 8, fiber accommodating portion 40 includes a first accommodating portion 41, an inner-diameter changing portion 42, and a second accommodating portion 43. In FIG. 6, two dashed lines shown in each optical fiber 22 indicate a boundary B1 between first diameter portion 31 and tapered portion 33 and a boundary B2 between second diameter portion 32 and tapered portion 33, respectively. Two dashed lines shown in ferrule 24 indicate a boundary B3 between first accommodating portion 41 and inner-diameter changing portion 42, and a boundary B4 between inner-diameter changing portion 42 and second accommodating portion 43, respectively.

Second accommodating portion 43 has an inner diameter that is larger than that of first accommodating portion 41. Inner-diameter changing portion 42 has a tapered shape. Inner-diameter changing portion 42 connects first accommodating portion 41 and second accommodating portion 43 by a tapered surface. Inner-diameter changing portion 42 may connect first accommodating portion 41 and second accommodating portion 43 by a curved surface.

First diameter portion 31 of each of the plurality of optical fibers 22 is located in first accommodating portion 41, inner-diameter changing portion 42, and second accommodating portion 43. Second diameter portion 32 of each of the plurality of optical fibers 22 is not located in first accommodating portion 41 or inner-diameter changing portion 42, but is located only in second accommodating portion 43. All of the plurality of tapered portions 33 included in the plurality of optical fibers 22 are located within second accommodating portion 43. Each optical fiber 22 is spaced apart from an inner surface 44a of ferrule 24 at inner-diameter changing portion 42. Inner surface 44a is a surface that defines inner hole 24a.

The length of ferrule 24 in direction A is 6 mm to 11 mm in direction A, for example. Ferrule 24 is composed of a ceramic material such as zirconia or a glass material. In the configuration shown in FIG. 8, the length of ferrule 24 in direction A is 6.5 mm. The length of first accommodating portion 41 in direction A, i.e. in the direction of extension of ferrule 24, is for example 2 mm or more. The length of inner-diameter changing portion 42 in the extension direction of ferrule 24 is, for example, 1 mm or more. The length of second accommodating portion 43 in the extension direction of ferrule 24 is, for example, 2 mm or more. The connecting portion between first diameter portion 31 and second diameter portion 32 of each optical fiber 22 is separated from boundary B4 between inner-diameter changing portion 42 and second accommodating portion 43 by 0.5 mm or more in direction A. Boundary B1 between first diameter portion 31 and tapered portion 33 of each optical fiber 22 is separated from boundary B4 between inner-diameter changing portion 42 and second accommodating portion 43 by 0.5 mm or more in direction A.

The plurality of first diameter portions 31 included in the plurality of optical fibers 22 are arranged at a first pitch in first accommodating portion 41 of fiber accommodating portion 40 when viewed from direction A. The first pitch is, for example, the core pitch of cores 22a in first diameter portion 31. The plurality of second diameter portions 32 included in the plurality of optical fibers 22 are arranged at the second pitch equal to or larger than the first pitch in second accommodating portion 43 of fiber accommodating portion 40 when viewed from direction A. The second pitch is, for example, the core pitch of cores 22a in second diameter portion 32.

When first diameter portions 31 of adjacent optical fibers 22 are in contact with each other, the first pitch is equal to the sum of the radius of first diameter portion 31 of one of adjacent optical fibers 22 and the radius of first diameter portion 31 of the other of adjacent optical fibers 22. In other words, when first diameter portions 31 of adjacent optical fibers 22 are in contact with each other, the first pitch is a value obtained by dividing the sum of the outer diameters of first diameter portions 31 of adjacent optical fibers 22 by 2. Therefore, when the outer diameters of first diameter portions 31 of optical fibers 22 adjacent to each other are equal to each other, the first pitch is equal to the outer diameter of first diameter portion 31. When first diameter portions 31 of adjacent optical fibers 22 are not in contact with each other, the first pitch is larger than a value obtained by dividing the sum of the outer diameters of adjacent optical fibers 22 by 2. Similarly, when second diameter portions 32 of adjacent optical fibers 22 are in contact with each other, the second pitch is equal to the sum of the radius of second diameter portion 32 of one of adjacent optical fibers 22 and the radius of second diameter portion 32 of the other of adjacent optical fibers 22. In other words, when second diameter portions 32 of adjacent optical fibers 22 are in contact with each other, the second pitch is a value obtained by dividing the sum of the outer diameters of second diameter portions 32 of optical fibers 22 adjacent to each other by 2. Therefore, when the outer diameters of second diameter portions 32 of optical fibers 22 adjacent to each other are equal to each other, the second pitch is equal to the outer diameter of second diameter portion 32. When second diameter portions 32 of adjacent optical fibers 22 are not in contact with each other, the second pitch is larger than the outer diameter of second diameter portion 32.

When clearances are provided between the plurality of optical fibers 22 and inner hole 24a, the pitch at which optical fibers 22 are arranged may vary within the range of the clearances. The clearances between first diameter portions 31 of the plurality of optical fibers 22 and inner hole 24a of first accommodating portion 41 are smaller than the clearances between second diameter portions 32 of the plurality of optical fibers 22 and inner hole 24a of second accommodating portion 43. The clearances between first diameter portions 31 of the plurality of optical fibers 22 and inner hole 24a of first accommodating portion 41 is substantially zero. For example, at tip surface 22c, when the diameter of each of four first diameter portions 31 is 40 µm, the inner diameter of inner hole 24a of first accommodating portion 41 is about 97 µm. When the diameter of each of four second diameter portions 32 is 125 µm, the inner diameter of inner hole 24a of second accommodating portion 43 is about 310 µm to 400 µm.

Due to the clearances between second diameter portions 32 of the plurality of optical fibers 22 and inner hole 24a of second accommodating portion 43, second diameter portion 32 may be irregularly located in second accommodating portion 43. Therefore, at least one pair of second diameter portions 32 of the plurality of optical fibers 22 are arranged at a pitch equal to or larger than the outer diameters of second diameter portions 32 in fiber accommodating portion 40 when viewed in direction A. The pitch at which second diameter portions 32 of a first group of the plurality of optical fibers 22 are arranged may be larger than the pitch at which second diameter portions 32 of a second group of the plurality of optical fibers 22 are arranged. The first group and the second group are groups each including a plurality of second diameter portions 32 having different combinations. Same second diameter portion 32 may be included in the first group and the second group. For example, adjacent second diameter portions 32 of the first group are in contact with each other and adjacent second diameter portions 32 of the second group are spaced apart from each other.

As shown in FIG. 9, tapered portions 33 of adjacent optical fibers 22 of the plurality of optical fibers 22 are displaced from each other in direction A. In other words, tapered portions 33 of optical fibers 22 adjacent to each other among the plurality of optical fibers 22 do not overlap each other when viewed from the direction orthogonal to direction A.

In the configuration shown in FIGS. 5 and 6, not all tapered portions 33 of the plurality of optical fibers 22 overlap each other when viewed in a direction perpendicular to direction A. In a modification of the present embodiment, tapered portions 33 of optical fibers 22 that are not adjacent to each other in the plurality of optical fibers 22 may overlap when viewed in a direction perpendicular to direction A.

As shown in FIG. 9, second accommodating portion 43 includes a plurality of regions R1 and R2 separated by a plurality of imaginary planes perpendicular to direction A. The plurality of imaginary planes include, for example, an imaginary plane including boundary B1 of optical fiber 22 and an imaginary plane including boundary B2 of optical fiber 22. Tapered portions 33 of adjacent optical fibers 22A and 22B among the plurality of optical fibers 22 are located in different regions R1 and R2 among the plurality of regions, respectively. For example, tapered portion 33 of optical fiber 22A is located in region R2. For example, tapered portion 33 of optical fiber 22B is located in region R1. For example, region R1 is a region sandwiched between boundary B1 of optical fiber 22B and boundary B2 of optical fiber 22B. For example, region R2 is a region sandwiched between boundary B1 of optical fiber 22A and boundary B2 of optical fiber 22A.

For example, when the plurality of optical fibers 22 accommodated in fiber accommodating portion 40 consists of four optical fibers 22, tapered portions 33 of four optical fibers 22 are located in different regions from each other among the plurality of regions.

Figure 10:
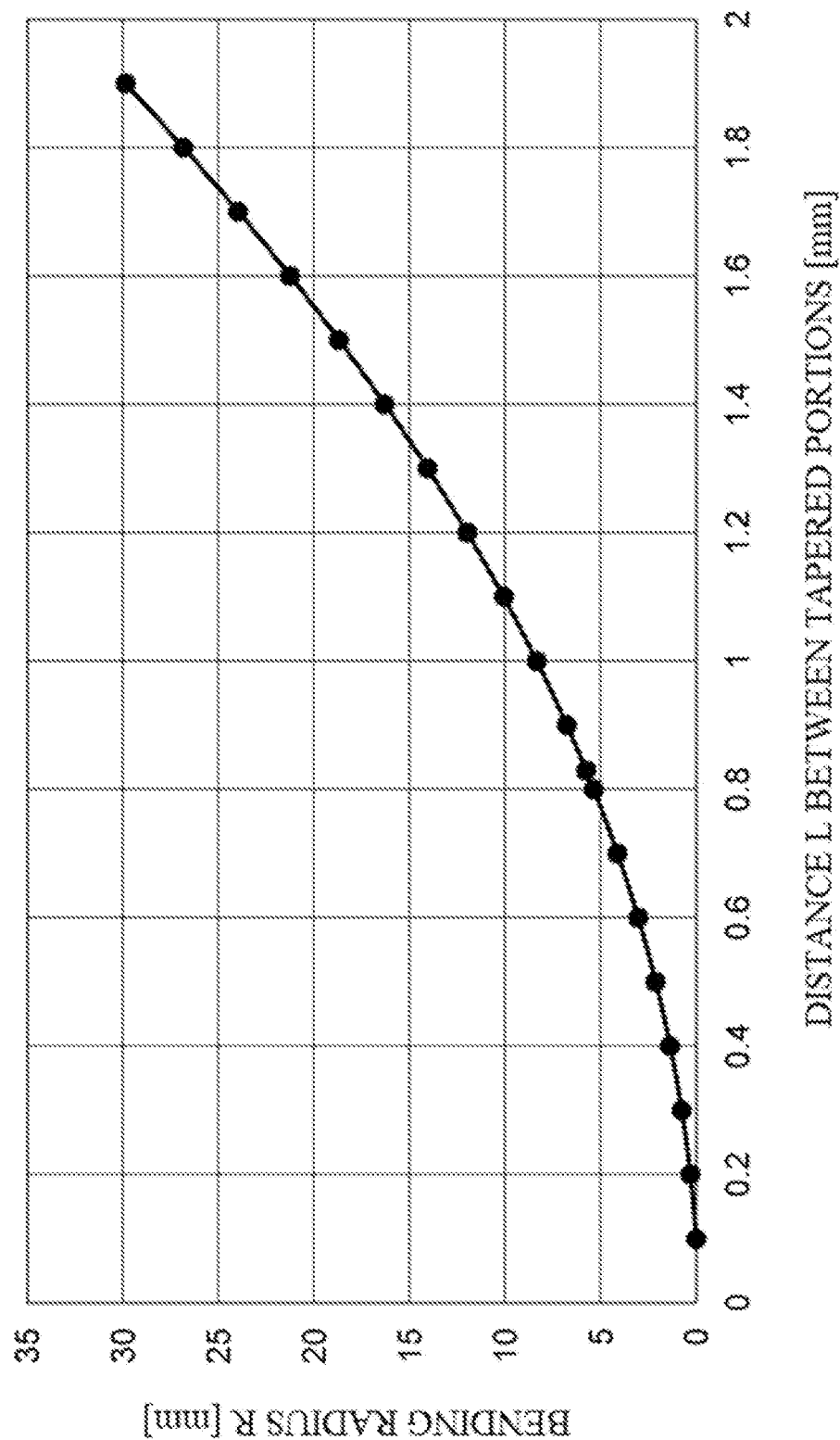
FIG. 10 is a graph showing the relationship between a bending of an optical fiber and a distance between tapered portions.

Referring to FIGS. 9 and 10, the relationship between the distance L between tapered portions 33 of adjacent optical fibers 22 and the bending of optical fibers 22 will be described. FIG. 9 is a partially enlarged view showing the tip portions of the plurality of optical fibers 22 accommodated in fiber accommodating portion 40.

For example, as shown in FIG. 9, the plurality of optical fibers 22 include optical fibers 22A and 22B adjacent to each other. For example, tapered portion 33 of optical fiber 22B is closer to first accommodating portion 41 of fiber accommodating portion 40 than tapered portion 33 of optical fiber 22A. The bending of optical fiber 22A which is one of the optical fibers adjacent to each other depends on the distance L between tapered portions 33 of adjacent optical fibers 22A, 22B in direction A. Hereinafter, the distance between tapered portions 33 of optical fibers 22A and 22B in direction A is also referred to as "distance between tapered portions".

For example, the bending of first diameter portion 31 of optical fiber 22A which is one of the optical fibers adjacent to each other depends on the distance in direction A between boundary B1 and a contact point C1, boundary B1 being a boundary between first diameter portion 31 and tapered portion 33 of optical fiber 22A and contact point C1 being a boundary between first diameter portion 31 of optical fiber 22A and optical fiber 22B. Contact point C1 corresponds to, for example, a contact point between first diameter portion 31 of optical fiber 22A and boundary B2 between second diameter portion 32 and tapered portion 33 of optical fiber 22B.

In optical fiber 22A, the bending radius of first diameter portion 31 between boundary B1 and contact point C1 is "R", and the angle formed by the normal line passing through contact point C1 and the extension line of boundary B1 is "$\theta_1$". "Bending radius" corresponds to "radius of curvature". A line segment S1 between boundary B2 of optical fiber 22B and boundary B1 of optical fiber 22A in direction A corresponds to a distance L between tapered portions of optical fibers 22A and 22B in direction A. A line segment S2 between the intersection point of a central axis CE and the extension line of boundary B2 of optical fiber 22A and the intersection point of central axis CE and boundary B1 of the optical fiber 22B can be represented by S2=$R\theta_1$. In this case, distance L between tapered portions of optical fibers 22A and 22B in direction A is expressed by the following formula (1).

$$L \cong R\theta_1 \qquad \text{[Equation 1]}$$

When the diameter of first diameter portion 31 is "$d_1$" and the diameter of second diameter portion 32 is "$d_2$", formula (2): $R\theta_1 \sin(\theta_2)=d_3=(d_2-d_1)/2$ is satisfied. $\theta_2$ corresponds to $\theta_1/2$. When $\theta_1/2$ is sufficiently small, the following formula (3) is satisfied.

[Equation 2]
$$\sin\left(\frac{\theta_1}{2}\right) \cong \frac{\theta_1}{2} \qquad (3)$$

Formula (4) is derived from formula (2) and formula (3).

[Equation 3]
$$R\theta_1 \sin\left(\frac{\theta_1}{2}\right) \cong \frac{R\theta_1^2}{2} = \frac{d_2 - d_1}{2} \qquad (4)$$

Formula (5) is derived by transforming formula (4).

[Equation 4]
$$\theta_1 = \sqrt{\frac{d_2 - d_1}{R}} \qquad (5)$$

Formula (6) is derived from formula (2) and formula (5).

[Equation 5]
$$L \cong R\theta_1 = \sqrt{R(d_2 - d_1)} \qquad (6)$$

Formula (7) is derived by transforming formula (6).

[Equation 6]
$$R \cong \frac{L^2}{d_2 - d_1} \qquad (7)$$

FIG. 10 is a graph showing the relationship between the bending of the optical fiber and distance L between tapered portions of optical fiber 22A. For example, a diameter d1 of first diameter portion 31 is 0.04 mm and a diameter d2 of second diameter portion 32 is 0.125 mm. When distance L between tapered portions of adjacent optical fibers 22A and 22B is 0.3 mm, bending radius R is 0.7 mm. When distance L between tapered portions of adjacent optical fibers 22A and 22B is 0.35 mm, bending radius R is 1.0 mm. When distance L between tapered portions of adjacent optical fibers 22A and 22B is 0.6 mm, bending radius R is 3 mm. When distance L between tapered portions of adjacent optical fibers 22A and 22B is 0.83 mm, bending radius R is 5.7 mm. The longer the distance L between tapered portions of adjacent optical fibers 22A and 22B is, the larger the bending radius R is. Therefore, the larger the distance L between tapered portions of optical fibers 22A and 22B adjacent to each other is, the smaller the bending of optical fibers 22A and 22B is. In other words, as distance L between tapered portions increases, the bending of optical fibers 22A and 22B can be reduced more. When distance L between tapered portions of adjacent optical fibers 22A and 22B is 0.35 mm, bending radius R can be at least 1 mm or more.

When distance L between tapered portions of adjacent optical fibers 22A and 22B is too large, tapered portion 33 or first diameter portion 31 of optical fiber 22 may protrude from the rear end of ferrule 14. In this case, since the strengths of tapered portion 33 and first diameter portion 31 are relatively weak, the robustness is reduced.

For example, a case in which four optical fibers 22 are accommodated in fiber accommodating portion 40 and all tapered portions 33 of four optical fibers 22 are disposed so as not to overlap each other when viewed from the direction orthogonal to direction A will be considered. For example, when the length of second accommodating portion 43 in ferrule 14 is 2.5 mm, distance L between tapered portions may be 0.83 mm or less.

In direction A, distance L between tapered portions of optical fibers 22A and 22B adjacent to each other is 0.7 mm or less. In direction A, distance L between tapered portions of optical fibers 22A and 22B adjacent to each other is 0.2 mm or more. In other words, tapered portions 33 of adjacent optical fibers 22 are spaced apart from each other by 0.2 mm or more in direction A.

Second optical fiber holder 20 described above is manufactured by, for example, the following steps. First, ferrule 24 and the plurality of optical fibers 22 are prepared.

Next, the plurality of optical fibers 22 are pushed into ferrule 24 so that first diameter portions 31 of the plurality of optical fibers 22 are inserted into first accommodating portion 41 of ferrule 24. The pushing direction is along direction A. At this time, first diameter portion 31 of each optical fiber 22 is inserted into first accommodating portion 41, and each optical fiber 22 is exposed from end surface 24b of ferrule 24. In this state, for example, tapered portion 33 of at least one optical fiber 22 is located at inner-diameter changing portion 42 of ferrule 24.

Next, after the plurality of optical fibers 22 are pushed into ferrule 24, the plurality of optical fibers 22 are pulled back in a direction opposite to a direction in which the plurality of optical fibers 22 are pushed while maintaining a state in which first diameter portion 31 of each of the plurality of optical fibers 22 is located in first accommodating portion 41. At this time, the plurality of optical fibers 22 are pulled back in a direction opposite to the direction in which the plurality of optical fibers 22 are pushed so that second diameter portion 32 of each of the plurality of optical fibers 22 is located in second accommodating portion 43 and tapered portions 33 of adjacent optical fibers 22 are located in different regions R1 and R2 of second accommodating portion 43. Regions R1 and R2 are regions divided by a plurality of imaginary planes orthogonal to direction A.

By pulling the plurality of optical fibers 22 back, the bending of the plurality of optical fibers 22 is reduced. As the plurality of optical fibers 22 are pulled back, first diameter portion 31 of each optical fiber 22 is located at first accommodating portion 41, inner-diameter changing portion 42, and second accommodating portion 43, and each optical fiber 22 is spaced apart from inner surface 44a of ferrule 24 at inner-diameter changing portion 42. For example, the plurality of optical fibers 22 are pulled back such that the connecting portion between first diameter portion 31 and tapered portion 33 of each optical fiber 22 is separated from the boundary between inner-diameter changing portion 42 and second accommodating portion 43 by 0.5 mm or more in direction A.

Next, adhesive portion 25 is filled into fiber accommodating portion 40 and cured. As a result, each optical fiber 22 is fixed to ferrule 24. Through the above steps, second optical fiber holder 20 is manufactured.

Figure 11:
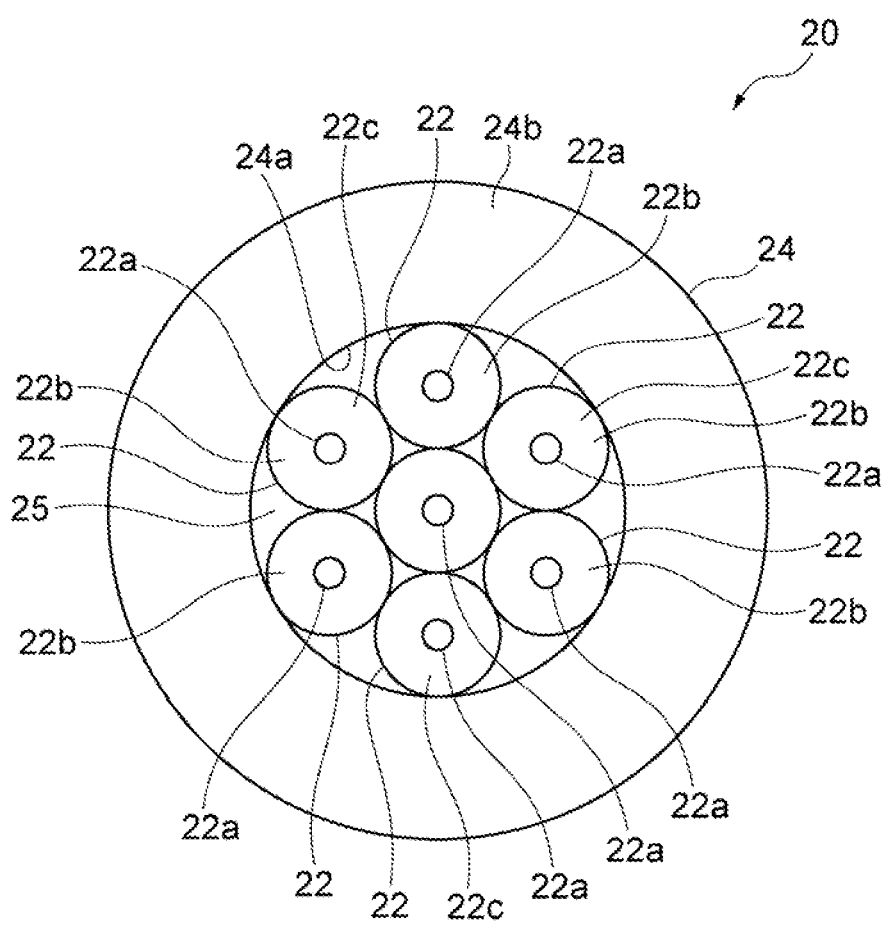
FIG. 11 shows an end surface of a second optical fiber holder in a modification of an embodiment.
Figure 12:
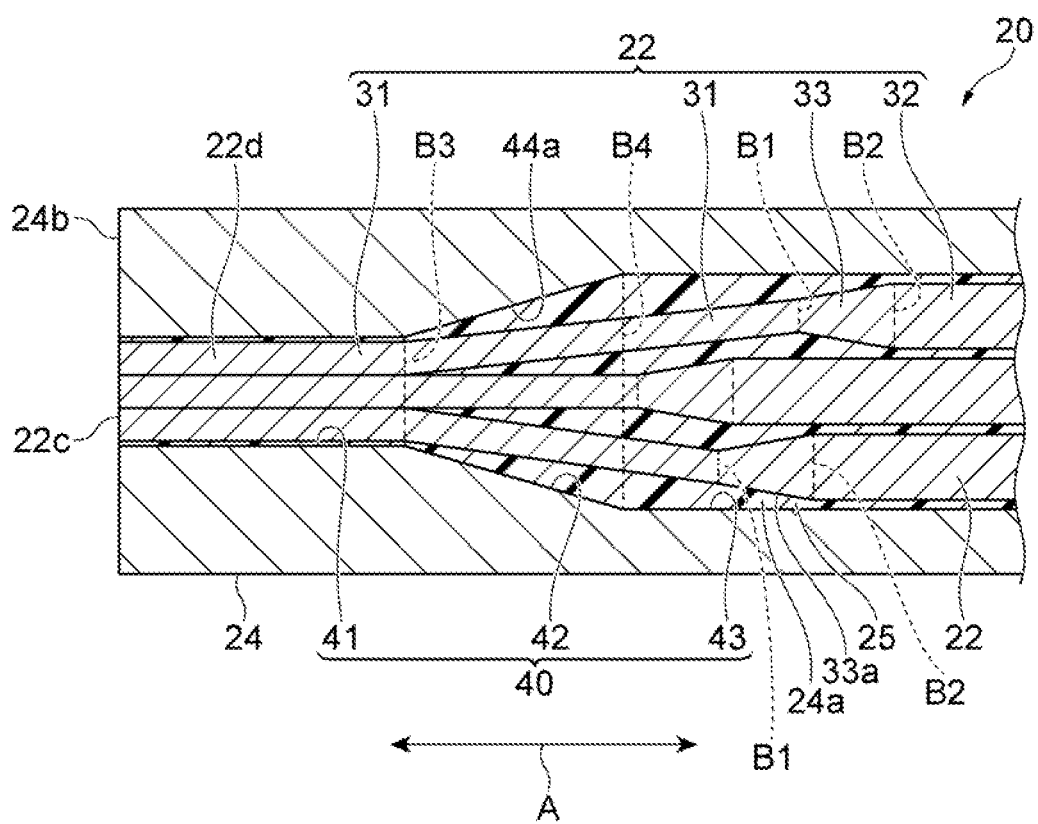
FIG. 12 is an enlarged partial cross-sectional view of a tip portion of a second optical fiber holder in a modification of an embodiment.

Next, the optical-fiber bundle structure in a modification of the present embodiment will be described with reference to FIGS. 11 and 12. FIG. 11 shows an end surface of a second optical fiber holder. FIG. 12 is an enlarged partial cross-sectional view of a tip portion of a second optical fiber holder. This modification is similar to or almost the same as the embodiments described above. In this modification, second optical fiber holder 20 has seven optical fibers 22, which is different from the embodiment described above. Hereinafter, differences between the above-described embodiment and the modification will be mainly described.

In this modification, as shown in FIG. 11, second optical fiber holder 20 has seven optical fibers 22. In this case, MCF 12 includes seven cores 12a. In FIG. 12, two dashed lines shown in each optical fiber 22 indicate boundary B1 between first diameter portion 31 and tapered portion 33 and boundary B2 between second diameter portion 32 and tapered portion 33, respectively. Two dashed lines shown in ferrule 24 indicate boundary B3 between first accommodating portion 41 and inner-diameter changing portion 42, and boundary B4 between inner-diameter changing portion 42 and second accommodating portion 43, respectively.

At tip surface 22c, the diameter of the circumscribed circle of first diameter portions 31 corresponds to the cladding diameter of MCF 12. The diameter of the circumscribed circle of first diameter portions 31 corresponds to the inner diameter of inner hole 24a of ferrule 24. At tip surface 22c, seven optical fibers 22 are two dimensionally close-packed in inner hole 24a.

In the configurations shown in FIGS. 11 and 12, tapered portions 33 of optical fibers 22 that are not adjacent to each other among the plurality of optical fibers 22 may overlap each other when viewed from the direction orthogonal to direction A. Also in the configurations shown in FIGS. 11 and 12, tapered portions 33 of optical fibers 22 adjacent to each other among the plurality of optical fibers 22 are displaced from each other in direction A. In other words, tapered portions 33 of optical fibers 22 adjacent to each other among the plurality of optical fibers 22 do not overlap each other when viewed from the direction orthogonal to direction A.

Tapered portions 33 of optical fibers 22 adjacent to each other among the plurality of optical fibers 22 are located in different regions among the plurality of regions. For example, optical fibers 22 adjacent to each other among tapered portions 33 of seven optical fibers 22 are located in different regions among the plurality of regions. Tapered portions 33 of optical fibers 22 that are not adjacent to each other among the seven optical fibers may overlap each other when viewed from the direction orthogonal to direction A.

Next, with reference to FIG. 10 and FIG. 11, the operational effect of optical connection structure 1 and the optical-fiber bundle structure of second optical fiber holder will be described.

In the configuration of second optical fiber holder 20, tapered portions 33 of optical fibers 22A and 22B adjacent to each other among the plurality of optical fibers 22 are located in different regions among the plurality of regions R1 and R2, respectively. According to this structure, the bending of optical fiber 22 is reduced, and the bending loss and the break of optical fiber 22 are reduced. Therefore, bending loss in second optical fiber holder 20 can be reduced, and yield and production throughput can be improved while maintaining desired performance. When the positions of tapered portions 33 of the plurality of optical fibers 22 overlap in direction A, that is, when tapered portions 33 of the plurality of optical fibers 22 are located in the same region, the bending of first diameter portion 31 is relatively large.

In second optical fiber holder 20, optical fibers 22A and 22B adjacent to each other may be configured to have an optical loss of 0.15 dB or less at the wavelength of 1.55 μm when light passes through the optical fibers 22A and 22B in a state where the optical fibers 22A and 22B are wound in single turns in the annular shapes of the radius curvature of 5 mm. In this case, the bending loss in the plurality of optical fibers 22A and 22B can be further reduced.

In second optical fiber holder 20, optical fibers 22A and 22B adjacent to each other may be configured to have an optical loss of 0.45 dB or less at the wavelength of 1.625 μm when light passes through the optical fibers 22A and 22B in a state where the optical fibers 22A and 22B are wound in single turns in the annular shapes of the radius curvature of 5 mm. In this case, the bending loss in the plurality of optical fibers 22A and 22B can be further reduced.

In second optical fiber holder 20, the length of first accommodating portion 41 in direction A may be 2 mm or more. In this case, since the gap between first accommodating portion 41 and optical fiber 22 is relatively small, the influence of expansion and contraction of adhesive portion 25 is reduced. Therefore, according to this configuration, first diameter portion 31 of each optical fiber 22 is easily held by first accommodating portion 41 of ferrule 24, and each optical fiber 22 is unlikely to be displaced with respect to ferrule 24. Further, as first accommodating portion 41 is longer, the positional accuracy of tip surface 22c of each optical fiber 22 with respect to ferrule 24 can be improved.

In second optical fiber holder 20, the plurality of first diameter portions 31 may be arranged at the first pitch in first accommodating portion 41. The plurality of second diameter portions 32 may be arranged at the second pitch larger than or equal to the first pitch in second accommodating portion 43. In this case, bending of the plurality of optical fibers 22 may be further reduced, and bending loss and break of the plurality of optical fibers 22 may be further reduced.

In second optical fiber holder 20, the plurality of optical fibers 22 may be four optical fibers 22. The tapered portions of four optical fibers 22 may be located in different regions among the plurality of regions, respectively. In this case, the bending of optical fiber 22 is further reduced, and the bending loss and the break of optical fiber 22 are further reduced.

In second optical fiber holder 20, tapered portions 33 of optical fibers 22A and 22B that are not adjacent to each other among the plurality of optical fibers 22 may overlap each other when viewed from a direction perpendicular to direction A. In this case, the size of second optical fiber holder 20 in direction A may be reduced.

In second optical fiber holder 20, the distance between tapered portions 33 of optical fibers 22 adjacent to each other in direction A may be 0.2 mm or more. In this case, the bending of optical fiber 22 is further reduced, and the bending loss and the break of optical fiber 22 are further reduced.

In second optical fiber holder 20, the plurality of tapered portions 33 included in the plurality of optical fibers 22 may be accommodated in second accommodating portion 43. In this case, tapered portions 33 of the plurality of optical fibers 22 may be protected by ferrule 24. Therefore, the robustness of the optical-fiber bundle structure may be improved.

In second optical fiber holder 20, distance L between tapered portions of optical fibers 22 adjacent to each other in the first direction may be 0.7 mm or less. In this case, the size of second optical fiber holder 20 in direction A may be reduced.

In second optical fiber holder 20, the diameter of first diameter portion 31 is reduced, and the strength of first diameter portion 31 is weak. In particular, when optical fiber 22 is bent, stress is likely to be concentrated on a connection portion between first diameter portion 31 whose diameter is reduced and second diameter portion 32 whose diameter is not reduced. The connection portion may break due to the concentrated stress. In addition, since first diameter portion 31 having a reduced diameter has a thin cladding, when first diameter portion 31 is bent, light distributed outside from core 22a is likely to leak as a loss. For example, when the clearances between the plurality of optical fibers 22 and inner hole 24a is relatively small, friction may occur when first diameter portions 31 of the plurality of optical fibers 22 are inserted into first accommodating portion 41. Therefore, as shown in FIGS. 10 and 11, when first diameter portions 31 of the plurality of optical fibers 22 are pushed into first accommodating portion 41, first diameter portions 31 may be bent.

In second optical fiber holder 20, first diameter portion 31 is located in first accommodating portion 41, inner-diameter changing portion 42, and second accommodating portion 43. Each optical fiber 22 is spaced apart from inner surface 44a of ferrule 24 at inner-diameter changing portion 42. According to such a structure, bending of core 22a of optical fiber 22 is reduced, and bending loss and break of optical fiber 22 are reduced. Therefore, bending loss in second optical fiber holder 20 may be reduced, and yield and production throughput may be improved while having desired performance.

As the length of first accommodating portion 41 decreases, the adhesive bonding strength between first diameter portions 31 of the plurality of optical fibers 22 and inner surface 44a of first accommodating portion 41 also decreases. Adhesive portion 25 expands or contracts according to a change in environmental temperature or humidity. Therefore, the position of optical fiber 22 with respect to ferrule 24 may be displaced due to the expansion and contraction of adhesive portion 25.

In second optical fiber holder 20, the pitch at which second diameter portions 32 of the first group of the plurality of optical fibers 22 are arranged is larger than the pitch at which second diameter portions 32 of the second group of the plurality of optical fibers 22 are arranged. According to this configuration, the bending of the plurality of optical fibers 22 can be further reduced, and the bending loss and break of the plurality of optical fibers can be further reduced.

Although the embodiments of the present disclosure have been described in detail above, the present disclosure is not limited to the above-described embodiments and can be applied to various embodiments. For example, in FIG. 5, second optical fiber holder 20 has four optical fibers 22, and in FIG. 11, second optical fiber holder 20 has seven optical fibers 22. However, the number of optical fibers 22 in second optical fiber holder 20 is not limited thereto. For example, second optical fiber holder 20 may include three optical fibers 22, eight optical fibers 22, or nineteen optical fibers 22. Similarly, MCF 12 may include three cores 12a, eight cores 12a, or 19 cores 12a.

What is claimed is:

1. An optical-fiber bundle structure comprising:
a ferrule including a fiber accommodating portion, the fiber accommodating portion being formed in a hollow shape having a circular cross section and extending in a first direction; and
a plurality of optical fibers accommodated in the fiber accommodating portion,
wherein each of the plurality of optical fibers includes a first diameter portion, a second diameter portion having a diameter larger than that of the first diameter portion, and a tapered portion connecting the first diameter portion and the second diameter portion to each other by a tapered surface having a tapered shape,
wherein the fiber accommodating portion includes a first accommodating portion and a second accommodating portion having an inner diameter larger than that of the first accommodating portion,
wherein the first diameter portion of each of the plurality of optical fibers is located in the first accommodating portion,
wherein the second diameter portion of each of the plurality of optical fibers is located in the second accommodating portion,
wherein the second accommodating portion includes a plurality of regions divided by a plurality of imaginary planes perpendicular to the first direction, and
wherein the tapered portions of the optical fibers adjacent to each other among the plurality of optical fibers are located in different regions among the plurality of regions.

2. The optical-fiber bundle structure according to claim 1, wherein the plurality of first diameter portions included in the plurality of optical fibers are arranged at a first pitch in the first accommodating portion, and wherein the plurality of second diameter portions included in the plurality of optical fibers are arranged at a second pitch in the second accommodating portion, the second pitch being equal to or larger than the first pitch.

3. The optical-fiber bundle structure according to claim 1, wherein the tapered portions of the optical fibers that are not adjacent to each other among the plurality of optical fibers overlap each other when viewed in a direction perpendicular to the first direction.

4. The optical-fiber bundle structure according to claim 3, wherein a length of the first accommodating portion in the first direction is 2 mm or more.

5. The optical-fiber bundle structure according to claim 4, wherein a distance in the first direction between the tapered portions of the optical fibers adjacent to each other is 0.2 mm or more.

6. The optical-fiber bundle structure according to claim 5, wherein a plurality of the tapered portions included in the plurality of optical fibers are located in the second accommodating portion.

7. The optical-fiber bundle structure according to claim 6, wherein a distance in the first direction between the tapered portions of the optical fibers adjacent to each other is 0.7 mm or less.

8. The optical-fiber bundle structure according to claim 1, wherein the plurality of optical fibers are four optical fibers, and
wherein the tapered portions of the four optical fibers are located in the different regions among the plurality of regions.

9. The optical-fiber bundle structure according to claim 1, wherein a length of the first accommodating portion in the first direction is 2 mm or more.

10. The optical-fiber bundle structure according to claim 1,
wherein a distance in the first direction between the tapered portions of the optical fibers adjacent to each other is 0.2 mm or more.

11. The optical-fiber bundle structure according to claim 1,
wherein a plurality of the tapered portions included in the plurality of optical fibers are located in the second accommodating portion.

12. The optical-fiber bundle structure according to claim 1,
wherein a distance in the first direction between the tapered portions of the optical fibers adjacent to each other is 0.7 mm or less.

13. The optical-fiber bundle structure according to claim 1,
wherein the optical fibers adjacent to each other are configured such that an optical loss when light passes through the optical fibers is 0.15 dB or less at the wavelength of 1.55 µm in a state in which the optical fibers are wound in a single turn in an annular shape having a radius of curvature of 5 mm.

14. The optical-fiber bundle structure according to claim 1,
wherein the optical fibers adjacent to each other are configured such that an optical loss when light passes through the optical fibers is 0.45 dB or less at the wavelength of 1.625 µm in a state in which the optical fibers are wound in a single turn in an annular shape having a radius of curvature of 5 mm.

15. An optical connection structure comprising:
the optical-fiber bundle structure according to claim 1; and
a multi-core fiber including a plurality of cores extending in the first direction and a cladding covering the plurality of cores,
wherein at least one of the plurality of cores included in the multi-core fiber and at least one core of the plurality of optical fibers are optically coupled to each other.

16. A method of manufacturing an optical-fiber bundle structure, the method comprising:
preparing a ferrule including a fiber accommodating portion formed in a hollow shape having a circular cross section, the fiber accommodating portion extending in a first direction and including a first accommodating portion and a second accommodating portion having an inner diameter larger than that of the first accommodating portion, and a plurality of optical fibers accommodated in the fiber accommodating portion, each of the plurality of optical fibers including a first diameter portion, a second diameter portion having a diameter larger than that of the first diameter portion, and a tapered portion connecting the first diameter portion and the second diameter portion to each other by a tapered surface having a tapered shape;
pushing the plurality of optical fibers into the ferrule such that the first diameter portions of the plurality of optical fibers are inserted into the first accommodating portion; and
pulling the plurality of optical fibers back in a direction opposite to a direction in which the plurality of optical fibers are pushed,
wherein the second accommodating portion includes a plurality of regions divided by a plurality of imaginary planes perpendicular to the first direction, and
wherein, in the pulling the plurality of optical fibers back, the plurality of optical fibers are pulled back in the direction opposite to the direction in which the plurality of optical fibers are pushed such that the second diameter portion of each of the plurality of optical fibers is located in the second accommodating portion and such that the tapered portions of the optical fibers adjacent to each other among the plurality of optical fibers are located in different regions among the plurality of regions while a state in which the first diameter portion of each of the plurality of optical fibers is located in the first accommodating portion is maintained.

* * * * *